United States Patent
Bacha et al.

[15] 3,686,314
[45] Aug. 22, 1972

[54] SELECTIVE EXTRACTION OF DIAMINOTOLUENE FROM AN AMMONOLYSIS PRODUCT MIXTURE

[72] Inventors: John D. Bacha; Charles M. Selwitz, both of Monroeville, Pa.

[73] Assignee: Gulf Research & Development Company, Pittsburgh, Pa.

[22] Filed: June 25, 1970

[21] Appl. No.: 49,940

[52] U.S. Cl..................................260/582, 260/581
[51] Int. Cl................................................C07c 85/16
[58] Field of Search..............................260/581, 582

[56] References Cited

UNITED STATES PATENTS 3,002,998   10/1961   Kaplan et al...............260/581
3,317,606   5/1967    Luberoff et al............260/582

*Primary Examiner*—Joseph Rebold
*Assistant Examiner*—Donald M. Papuga
*Attorney*—Meyer Neishloss, Deane E. Keith and Joseph J. Carducci

[57] ABSTRACT

Diaminotoluene is selectively separated from an ammonolysis product mixture comprising dichlorotoluene, aminochlorotoluene, diaminotoluene, a cuprous salt catalyst, by-product ammonium salts and excess aqueous ammonia by initially contacting the product mixture with a water immiscible hydrocarbon solvent, such as heptane, to extract all of the dichlorotoluene and aminochlorotoluene and essentially none of the diaminotoluene, and then contacting the residual diaminotoluene-rich aqueous phase with a water-immiscible organic solvent, such as methylene chloride, to extract substantially all of the diaminotoluene.

8 Claims, No Drawings

SELECTIVE EXTRACTION OF DIAMINOTOLUENE FROM AN AMMONOLYSIS PRODUCT MIXTURE

This invention relates to a method of separating diaminotoluene from a reaction mixture comprising the same and, more particularly, to a two-step extraction technique for selectively separating diaminotoluene from a dichlorotoluene ammonolysis product mixture containing dichlorotoluene, aminochlorotoluene, diaminotoluene, cuprous chloride catalyst, by-product ammonium chloride and excess aqueous ammonia.

Diaminotoluenes, which are useful starting materials for toluene diisocyanates and polyurethane materials, may be prepared by nitrating toluene to form dinitrotoluene, and then reducing the resulting dinitrotoluene. Diaminotoluenes may also be prepared from dichlorotoluenes by reaction with aqueous ammonia in the presence of a suitable catalyst at elevated temperatures and pressures. This latter technique for preparing diaminotoluenes is an extension of the well known method of preparing aniline from chlorobenzene as described in U.S. Pat. No. 2,432,551. However, it should be appreciated that although the aniline and diaminotoluene processes appear similar, the aniline process must differ from any diaminotoluene process because of subtle differences in the nature of the resultant products. Thus, the production of aniline involves the replacement of chlorine by an amine function, while diaminotoluene preparation requires the replacement of two chlorines attached to the aromatic nucleus. In the latter situation, replacement occurs in stepwise fashion and intermediate monoaminochlorotoluenes result, e.g., equations 1 and 2.

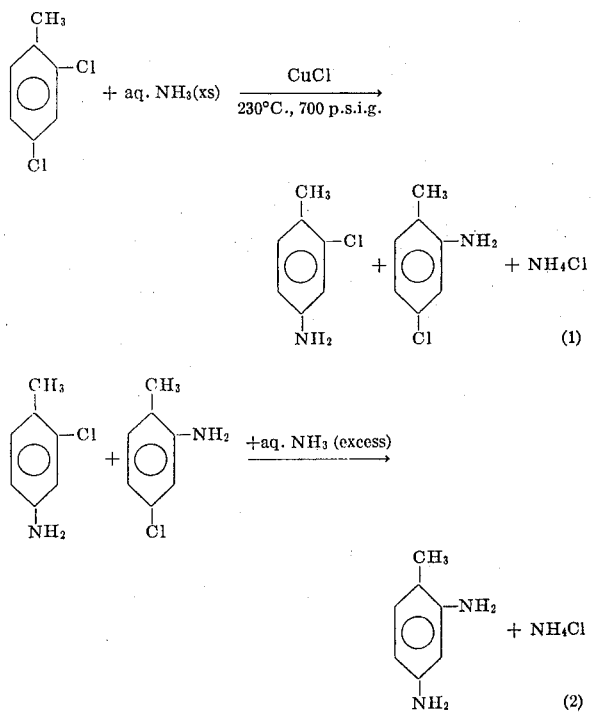

The above reactions are most economically carried out to less than 100 percent conversion. Thus, the product mixture contains unreacted dichlorotoluene, partially converted aminochlorotoluenes and desired diaminotoluenes, along with by-product ammonium chloride and copper catalyst dissolved in the excess aqueous ammonia. However, unlike aniline, which is only slightly soluble in water and can be isolated after ammonolysis of chlorobenzene by organic-aqueous phase separation, diaminotoluenes are very soluble in water. Accordingly, the isolation of diaminotoluenes from dichlorotoluene ammonolysis reaction mixtures has generally been laden with problems that necessitate laborious, time consuming and expensive separation procedures. In this connection, simple distillation is impractical because of the large quantities of ammonia and water that would have to be distilled. Similarly, crystallization effected by cooling would be impractical since it would undoubtedly be incomplete; moreover, crystallization would require expensive refrigeration equipment. Finally, even simple extraction techniques are complicated by the nature of the product mixture involved. For example the simplest extraction would involve contacting the dichlorotoluene ammonolysis product mixture with a water immiscible solvent to remove all organic materials, leaving behind an aqueous ammonia solution of catalyst and ammonium chloride by-product. The resulting organic solution would then be distilled to recover solvent, dichlorotoluene and amino-chlorotoluene for recycle and diaminotoluene product. The latter two materials, however, have relatively high boiling points and are most probably susceptible to deterioration at elevated temperatures. Accordingly, the necessity of employing expensive equipment for vacuum distillation to obviate the temperature problem would render this extraction technique uneconomical.

Accordingly, it is desirable to provide a simple, economical and reliable method of selectively removing diaminotoluenes from a dichlorotoluene ammonolysis product mixture which avoids the above discussed prior art difficulties.

In accordance with the present invention, we have unexpectedly discovered a two stage extraction technique which obviates the need for employing a distillation procedure for separating the higher boiling organic products. More specifically, we have found that an essentially completely selective isolation of diaminotoluenes from a dichlorotoluene ammonolysis product mixture can be effected by first contacting the ammonolysis product mixture with a solvent that will extract essentially all of the dichlorotoluenes and amino-chlorotoluenes and only a very small amount of the desired diaminotoluenes so as to leave behind an aqueous ammonia solution containing by-product ammonium chloride, copper catalyst and substantially all of the desired diaminotoluenes. This initial separation is effectively carried out merely by bringing the dichlorotoluene ammonolysis product mixture into contact with a hydrocarbon solvent, such as a normally liquid paraffin or olefin or mixtures thereof, preferably a paraffin, having from about five to about 18 carbon atoms, preferably from about five to about 12 carbon atoms, at a temperature between about 0° and about 60° C., preferably about 20° to about 40° C. The contact may be made at any suitable pressure, with atmospheric pressure being preferred. The minimum level of solvent required for the initial extraction is about one volume of solvent per volume of the dichlorotoluene ammonolysis product mixture, with levels of from about two to about four volumes of solvent per volume of product mixture being preferred.

The aqueous ammonia solution containing the diaminotoluene is then contacted with any suitable water immiscible organic solvent that will substantially completely extract the diaminotoluene from the remaining aqueous phase. In practice, the second or diaminotoluene extraction is effectively carried out by contacting the residual aqueous phase from the initial extraction with an organic solvent, such as ethyl acetate or a chlorinated hydrocarbon having the formula:

$$C_n Cl_x H_{2n+2-x},$$

wherein $n$ is an integer greater than zero, preferably from one to about four, and wherein $x$ is an integer greater than zero, and less than $(2n+2)$. The minimum level of solvent required for the second extraction is that volume amount equal to the volume of the system being treated. In a preferred embodiment, from about one to about five times the minimum solvent level is employed. As is the case with the initial extraction, the temperature and pressure conditions of the second extraction are not critical. Accordingly, the second extraction may be effectively carried out under similar conditions of temperature and pressure as those employed in the initial extraction.

The residence times or contact times between the above identified solvents and systems being extracted therewith are dependent upon the various factors discussed hereinabove and, accordingly, can be widely varied. However, the minimum residence time for each of the extractions should be that time required for contacting the respective liquids and for allowing the immiscible liquid phases to separate.

Under certain reaction conditions, the ammonolysis reaction by which dichlorotoluene is converted to aminochlorotoluene and diaminotoluene is complicated by the presence of a competing hydrogenolysis reaction which affords chlorotoluene and toluidine side-products. In the latter reaction, chlorine on the aromatic nucleus is replaced by hydrogen. In the selective extraction of the present invention, the side-products are removed by the initial extraction and do not contaminate the diaminotoluene product. The side-products can then be removed from the dichlorotoluene and aminochlorotoluene by an suitable method.

The selectivity of the above defined initial extraction was totally unexpected in that the aminochlorotoluene behaved much more like the dichlorotoluene than the diaminotoluene as far as their solubility characteristics are concerned. Similarly, the efficiency with which diaminotoluene was removed from the aqueous phase by ethyl acetate and certain chlorinated hydrocarbons was equally unexpected. In practice, the dichlorotoluenes and aminochlorotoluenes separated in the initial extraction may be recycled to the ammonolysis reactor after the solvent is stripped therefrom. Similarly, the product diaminotoluene may be isolated from the organic phase of the second extraction system by stripping the solvent therefrom. Alternatively, the diaminotoluene may be isolated as its di-hydrogen chloride salt by treatment of the organic solution of diamonotoluene with dry hydrogen chloride. The salt precipitates upon such treatment and can be isolated by filtration.

The process defined herein can further be illustrated by the following:

EXAMPLE 1

A typical ammonolysis product mixture was prepared in a 250 ml. flask by admixing 30.6 m moles of 2,4-dichlorotoluene, 23.0 m moles of 4-amino-2-chlorotoluene, 23.0 m moles of 2,4-diamonotoluene, 30.0 m moles of cuprous chloride and 60.0 ml. of 15 percent aqueous ammonia. The mixture was then extracted with 3-25 ml. portions of methylene chloride, whereafter the combined extracts were analyzed by gas chromatography employing a 5 foot × ⅛inch stainless steel column packed with 5 percent Bentone 34 and 15 percent Hyprose SP-80 on KOH treated chromosorb W, 60/80 mesh, operated isothermally at 100° and 140° C.

The resulting analysis, which appears in Table I under the designation Example 1, indicates all of the dichlorotoluene and aminochlorotoluene and most of the diaminotoluene had been removed by the methylene chloride and that an aqueous ammonia solution of cuprous chloride was left behind.

EXAMPLE 2

A second mixture, similar to that of Example 1, was prepared in a 250 ml. flask by admixing 31.0 m moles of 2,4-dichlorotoluene, 24.0 m moles of 4-amino-2-chlorotoluene, 23.0 m moles of 2,4-diaminotoluene and 75.0 ml. of 14 percent aqueous ammonia. The resulting mixture was extracted with 4-25 ml. portions of heptane, whereafter the combined extracts were analyzed by gas chromotography. The analysis, which is tabulated under the designation Example 2 in Table I, indicates that virtually all of the dichlorotoluene and aminochlorotoluene had been removed, and that except for a trace found in the heptane extracts, the diaminotoluene remained behind in the aqueous ammonia solution. The diaminotoluene was subsequently removed by extraction with 6-25 ml. portions of methylene chloride.

EXAMPLE 3

A third mixture, similar to those described in Examples 1 and 2, was prepared in a carbon steel autoclave of the type normally employed for carrying out an ammonolysis reaction by admixing 124.0 m moles of 2,4-dichlorotoluene, 54.4 m moles of 2-amino-5-chlorotoluene, 27.6 m moles of 2,4-diaminotoluene, 25.4 m moles of 2,5-diaminotoluene, 91.0 m moles of cuprous chloride and 120.0 ml. of 29 percent aqueous ammonia. The mixture was then stirred for 2 hours without heating. Thereafter, the mixture was removed and extracted first, with 5-100 ml. portions of heptane and then, with 5-100 ml. portions of methylene chloride. By gas chromatographic analysis the dichlorotoluene and aminochlorotoluene were found to be largely removed by the heptane, while the diaminotoluenes were concentrated in the methylene chloride. An aqueous ammonical copper chloride solution remained. The results are set forth below in Table I. In this connection, it should be noted that the deviation from 100 percent recovery of charged materials was not due to materials being left in the aqueous solution, but rather due to oxidative and mechanical losses of these materials, especially the diaminotoluenes.

cent aqueous ammonia. The mixture was heated with stirring to 225° C. for 1 hour; the maximum pressure that developed being 780 psig. Thereafter, the system was cooled and the product removed. The product mix-

TABLE I.—EXTRACTION OF SYNTHETIC AMMONOLYSIS PRODUCT MIXTURES

| Example | Charge [a] (mmoles or ml.) | Extraction solvent | Number of extractions | Total volume of solvent (ml.) | "Product" DCT | Removed [b] ACT | (Mole percent) DAT |
|---|---|---|---|---|---|---|---|
| 1 | 2,4-DCT (30.6) ACT [c] (23.0) 2,4-DAT (23.0) CuCl (30.0) 15% aq. NH$_3$ (60 ml.) | CH$_2$Cl$_2$ | 3 | 75 | (100) | (100) | (92.4) |
| 2 | 2,4-DCT (31.0) ACT [c] (24.0) 2,4-DAT (23.0) 14% aq. NH$_3$ (75 ml.) | Heptane CH$_2$Cl$_2$ | 4 6 | 100 150 | 100 0 | 99.8 0.2 | 0.2 98.2 |
| 3 [e] | 2,4-DCT (124.0) ACT [d] (54.4) 2,4-DAT (27.6) 2,5-DAT (25.4) CuCl (91.0) 29% aq. NH$_3$ (120 ml.) | Heptane CH$_2$Cl$_2$ | 5 5 | 500 500 | 96.8(96.8) 3.2(3.2) | 96.2(93.1) 3.8(3.7) | {[f] 0.6(<0.5) [g] 0.7(<0.5)} {[f] 99.4(88.5) [g] 99.3(71.0)} |

[a] DCT=dichlorotoluene, ACT=aminochlorotoluene, DAT=diaminotoluene.
[b] Figures in ( ) actual mole percent by gas-liquid chromatographic analysis; others are normalized distribution between extraction solvents.
[c] 4-amino-2-chlorotoluene.
[d] 2-amino-5-chlorotoluene.
[e] Mixture actually placed in and removed from reactor; other runs simply prepared in glassware.
[f] 2,4-diaminotoluene.
[g] 2,5-diaminotoluene.

The data set forth in Table I clearly illustrate the advantages of operation in accordance with the defined procedure. For instance, the results of Example 1 indicate that a selective separation of diaminotoluene cannot be effected by employing methylene chloride as an initial extraction solvent since methylene chloride will remove all of the dichlorotoluene and aminochlorotoluene and substantially all of the diaminotoluene present in the mixture. Thus, to effect a selective separation of diaminotoluene, the procedure of Example 1 must be followed by an economically undesirable distillation or crystallization procedure. On the other hand, the results of Examples 2 and 3 indicate the high degree of selectivity obtainable in accordance with the present invention when operating with a synthetically prepared mixture corresponding in composition to a typical dichlorotoluene ammonolysis product mixture.

EXAMPLE 4

An actual dichlorotoluene ammonolysis product mixture was prepared in a carbon steel autoclave equipped with a mechanical stirrer, a cooling coil and a dip leg for product removal by admixing 0.230 moles of a dichlorotoluene mixture (31.0 percent, 2,6-; 22.6 percent, 2,4-; 46.4 percent, 2,5-dichlorotoluene), 0.091 moles of cuprous chloride and 120 ml. of 29 perture was extracted with 1-200 and 3-100 ml. portions of heptane; and the remainder further extracted with 5-100 ml. portions of methylene chloride. Gas chromatographic analysis of the extracts revealed the dichlorotoluene, chlorotoluene, toluidine and aminochlorotoluene products to be largely concentrated (96–98 percent) in the heptane extracts; all but a trace (<1 percent) of the diaminotoluene was found in the methylene chloride extracts. The results are tabulated in Table II.

EXAMPLE 5

An actual dichlorotoluene ammonolysis product mixture was prepared in accordance with Example 4, except that the charge was heated with stirring to 250° C. for 0.9 hours; the maximum pressure that developed being 1000 psig. After cooling, the product mixture was extracted with 5-100 ml. portions of ethyl acetate. The combined extracts were analyzed to determine the distribution of the materials removed by the ethyl acetate. The results are tabulated below in Table II.

TABLE II.—DICHLOROTOLUENE AMMONOLYSIS AND PRODUCT RECOVERY BY EXTRACTION

| Example | Charge (mmole) | Extraction solvent | number of extractions | Total volume of solvent (ml.) | DCT | Product removal [c-e] (mole percent) | | | |
|---|---|---|---|---|---|---|---|---|---|
| | | | | | | CT | TN | ACT | DAT |
| 4[a] | DCT mixt.[b] (230) CuCl (91) 29% aq. NH$_3$ (120 ml.) | Heptane CH$_2$Cl$_2$ | 4 5 | 500 500 | 97.6(53.0) 2.4(1.3) | 98(2.0) 2(0.04) | 98(1.1) 2(0.02) | 96.2(17.9) 3.8(0.7) | 0.8(0.6) 99.2(13.1) |
| 5[f] | 2,4-DCT (230) CuCl (91) 29% aq. NH$_3$ (120 ml.) | Ethyl acetate | 5 | 100 | (2.5) | (3.5) | (33.9) | (31.5) | (29.2) |

[a] Ammonolysis run conditions: 225° C., 780 p.s.i.g., 1.0 hour, carbon steel autoclave.
[b] 31.0%, 2,6-; 22.6%, 2,4-; 46.4%, 2,5-dichlorotoluene charged.
[c] DCT=dichlorotoluene, CT=chlorotoluene, TN=toluidine, ACT=aminochlorotoluene, DAT=diaminotoluene.
[d] All products contain mixtures of isomers.
[e] Figures in ( ) actual yields; others are normalized distributions between extraction solvents.
[f] Ammonolysis Run Conditions: 250°C., 100 p.s.i.g., 0.9 hours, carbon steel autoclave.

The data in Table II clearly indicate the advantages of operating in accordance with the present invention on actual ammonolysis product mixtures. Thus, Example 4 shows that by conducting an initial extraction with heptane and a subsequent extraction with methylene chloride, 99.2 percent of the diaminotoluene present in the ammonolysis product mixture can be selectively isolated without having to perform an additional distillation and/or crystallization operation. The results of Example 5 demonstrate that all of the organic products can be removed from the aqueous ammonia-product mixture with ethyl acetate as an extracting agent. The sum of actual product yield is, within experimental error, about 100 percent. Accordingly, Example 5 illustrates that ethyl acetate and related organic solvents could replace methylene chloride as an extraction solvent in the method of the present invention.

EXAMPLES 6-15

Typical mixtures of ammonolysis products and aqueous ammonia were prepared in the manner described in connection with Example 1. Each of the resultant mixtures was then extracted with one of a number of various hydrocarbons to demonstrate the suitability of a range of hydrocarbons for use as the initial extracting agent as contemplated by the present invention. The results of these examples are set forth in Table III as follows.

ing Examples 6 and 7, it becomes evident that using larger volumes of pentane afforded no significant variation in the product distribution of the extracted materials. Referring to Example 8, it can be seen that the small amount of diaminotoluene extracted by the heptane can be very easily removed therefrom by merely washing the heptane solution with as little as 5 percent water, by volume. In this connection, it will be noted that such washing has substantially no effect on either of the other components present in the solution being washed. By comparing Examples 8 and 9, it will be seen that the amount of diaminotoluene removed is substantially independent of the initial diaminotoluene concentration. Similarly, a comparison between Examples 8 and 10 indicates that the successful removal of aminochlorotoluene is substantially independent of the presence of dichlorotoluene. The successful removal of dichlorotoluene and aminochlorotoluene is also substantially independent of the presence of cuprous chloride and ammonium chloride (compare Examples 9 and 11).

When considering Example 12, it becomes apparent that when very small portions of heptane were used sig-

TABLE III.—RECYCLE MATERIAL EXTRACTION-HYDROCARBON VARIATION

| Example | Charge organics [a] (mmoles) | 15% aq. NH$_3$ (ml.) | Extraction solvent | Extraction vol., each (ml.) | Extraction number | Material extracted (mole percent) | | |
|---|---|---|---|---|---|---|---|---|
| | | | | | | DCT | ACT | DAT |
| 6 | DCT (31.0) ACT (24.7) DAT (23.0) | 65 | Pentane | 50 | 1+2 3 | >99 <1 | 98.8 1.0 | 3.8 0.6 |
| 7 | DCT (31.0) ACT (24.7) DAT (23.0) | 65 | Pentane | 100 | 1 2 3 | >99 <1 0 | 94.0 5.8 0.5 | 2.9 1.1 1.1 |
| 8 | DCT (31.0) ACT (24.7) DAT (23.0) | 65 | Heptane | 50 | 1+2 3 [b] (1+2) [c] (1+2) | >99 >1 | 97.0 1.1 95.6 97.0 | 3.8 0.8 [b] 0.4 [c] 0.6 |
| 9 | DCT (31.0) ACT (24.7) DAT (17.2) | 70 | Heptane | 50 | 1+2 3 | >99 <1 | 98.0 1.4 | 3.9 0.7 |
| 10 | DCT (0.0) ACT (24.7) DAT (23.0) | 65 | Heptane | 50 | 1+2 3 4 | | 97.6 1.9 0.3 | 3.0 0.6 0.5 |
| 11 [d] | DCT (31.0) ACT (24.7) DAT (17.2) | 70 | Heptane | 50 | 1+2 3 | >99 <1 | 97.5 0.9 | 2.9 0.5 |
| 12 | DCT (31.0) ACT (24.7) DAT (17.2) | 70 | Heptane | 15 | 1 2 3 4 5 | 98.6 1.3 <0.1 0 0 | 88.9 6.1 2.2 0.9 0.4 | 5.7 0.3 0.3 0.2 0.2 |
| 13 | DCT (31.0) ACT (24.7) DAT (17.2) | 70 | Dodecane | 50 | 1+2 3 | >99 <1 | 98.9 1.0 | 3.5 0.6 |
| 14 | DCT (31.0) ACT (24.7) DAT (17.2) | 70 | Hexene-1 | 50 | 1+2 3 [e] (1+2) | >99 <1 | 98.9 0.6 98.4 | 6.8 1.2 [e] 2.2 |
| 15 | DCT (31.0) ACT (24.7) DAT (17.2) | 70 | Benzene | 50 | 1+2 3 | >99 <1 | 98.8 0.3 | 51.7 14.3 |

[a] DCT=2,4-dichlorotoluene, ACT=4-amino-2-chlorotoluene, DAT=2,4-s diaminotoluene.
[b] Sample washed with 20 volume percent water; 3.4/3.8 or 90% DAT removed.
[c] Sample washed with 5 volume percent water; 3.2/3.8 or 84% DAT removed.
[d] Cuprous chloride (2.0 g., 20.2 mmoles) and ammonium chloride (2.0 g., 37.4 mmoles) added to aqueous ammonia.
[e] Sample washed with 5 volume percent water; 4.6/6.8 or 68% DAT removed.

As can be seen by comparing the tabulated results for Examples 6, 8, 9 and 13, pentane, heptane and dodecane are substantially equivalent in their ability to remove dichlorotoluene and aminochlorotoluene, along with only a very small amount of diaminotoluene, from the prepared mixture. Furthermore, by comparnificantly more diaminotoluene was found in the initial extract. Thus, more concentrated solutions of dichlorotoluene and aminochlorotoluene in heptane, for example, appear to provide a more polar medium for diaminotoluene to be dissolved in. However, despite the lack of other dissolved components, the final extracts in Example 12 still contained a trace of diaminotoluene. Thus, the diaminotoluene must have some very small solubility in the hydrocarbon solvent. Accordingly, extraction selectivity will always be less than 100 percent and excessively large volumes of such solvents should be avoided.

Example 14 illustrates that olefin, such as hexene-1 can be utilized as the initial extracting agent. However, when comparing the results obtained in Example 14 with those obtained in Example 9, it is evident that heptane, a saturated hydrocarbon, removed less diaminotoluene than hexene-1, an unsaturated hydrocarbon. Thus, even though the diaminotoluene can be removed from the hexene-1 by subsequent water washing, it appears that paraffins, such as pentane, heptane, dodecane and the like, and mixtures of such paraffins are preferred over olefins as initial extracting agents. Example 15 illustrates that benzene, an aromatic hydrocarbon, removed 66.0 percent of the diaminotoluene along with the desired materials. Thus, benzene and related hydrocarbons appear totally unsuitable as initial extracting agents.

EXAMPLES 16-23

Solutions of diaminotoluene in aqueous ammonia were prepared by admixing the indicated constituents in a 250 ml. flask. The resultant mixtures were then extracted with various chlorinated hydrocarbons to demonstrate the suitability of a range of these materials for the second extraction. The results of these examples are set forth in Table IV as follows:

As indicated by the data in Table IV (Examples 16, 18 and 19, respectively), methylene chloride, chloroform and dichloroethane are essentially equivalent in their ability to remove diaminotoluene from an aqueous ammonia solution, whereas tetrachloroethane is significantly more efficient (Example 20). Similarly, the data revealed that efficiency is virtually independent of the amount of diaminotoluene present, and that either 2,4-diaminotoluene or 2,5-diaminotoluene is removed with equal efficiency (compare Examples 16 and 17).

Examples 22 and 23 illustrate, respectively, that trichloroethylene, a chlorinated unsaturated hydrocarbon, and o-dichlorobenzene, a chlorinated aromatic hydrocarbon, are much less effective as extracting solvents that the chlorinated saturated hydrocarbons examined above. The main difficulty with these materials is that the solubility of diaminotoluene in them is less than its solubility in water. Thus, the partitioning of diaminotoluene between extracting solvent and water favors the water. Accordingly, it may be concluded that an important criterion for the suitability of the second solvent is that diaminotoluene be more soluble in it than in water. In this connection, approximate solubilities of 2,4-diaminotoluene in a variety of solvents have been determined and are tabulated below in Table V.

As would be expected in view of the data set forth in Table V, carbon tetrachloride has been found totally unsuitable as the second solvent (Example 21). This perchlorinated hydrocarbon can be classified as a nonpolar solvent which fails to dissolve significant quantities of diaminotoluene.

TABLE IV. — DIAMINOTOLUENE EXTRACTION-SOLVENT VARIATION

| Example | Charge DAT[a] (mmoles) | 15% aq. NH[3] (ml.) | Extraction solvent | Extraction volume, each (ml.) | Extraction number | DAT extracted[a] (mole percent) |
|---|---|---|---|---|---|---|
| 16 | 23.0 | 65 | Methylene chloride | 50 | 1 | 71.9 |
|   |   |   |   |   | 2 | 19.8 |
|   |   |   |   |   | 3 | 5.4 |
|   |   |   |   |   | 4 | 1.7 |
| 17 | [b]5.1 | 20 | Methylene chloride | 25 | 1 | [b]71.4 |
|   |   |   |   |   | 2 | [b]21.8 |
|   |   |   |   |   | 3 | [b]5.4 |
|   |   |   |   |   | 4 | [b]1.2 |
| 18 | 23.0 | 65 | Chloroform | 50 | 1 | 66.9 |
|   |   |   |   |   | 2 | 22.0 |
|   |   |   |   |   | 3 | 7.9 |
|   |   |   |   |   | 4 | 2.4 |
| 19 | 23.0 | 65 | 1,2-dichloroethane | 50 | 1 | 69.0 |
|   |   |   |   |   | 2 | 20.8 |
|   |   |   |   |   | 3 | 6.7 |
|   |   |   |   |   | 4 | 2.3 |
| 20 | 23.0 | 65 | 1,1,2,2-tetrachloroethane | 50 | 1 | 77.7 |
|   |   |   |   |   | 2 | 16.7 |
|   |   |   |   |   | 3 | 4.1 |
|   |   |   |   |   | 4 | 0.6 |
| 21 | 23.0 | 65 | Carbontetrachloride | 50 | 1 | 4.9 |
|   |   |   |   |   | 2 | 4.7 |
| 22 | 23.0 | 65 | Trichloroethylene | 50 | 1 | 21.0 |
|   |   |   |   |   | 2 | 17.0 |
|   |   |   |   |   | 3 | 13.5 |
|   |   |   |   |   | 4 | 10.4 |
| 23 | 23.0 | 65 | o-Dichlorobenzene | 50 | 1 | 22.4 |
|   |   |   |   |   | 2 | 17.1 |
|   |   |   |   |   | 3 | 14.6 |
|   |   |   |   |   | 4 | 11.5 |

[a] DAT=2,4-diaminotoluene or 2,5-diaminotoluene.
[b] 2,5-diaminotoluene.

TABLE V.

Solubility of 2,4-Diaminotoluene at 25±1°C.

| Solvent | Solubility (g./100 ml.) |
| --- | --- |
| Carbon Tetrachloride | <1.0 |
| Trichloroethylene | 1.8–2.0 |
| o-Dichlorobenzene | 2.1–2.3 |
| 15% aqueous ammonia | 4.0–4.3 |
| water | 4.0–4.3 |
| Chloroform | 7.5–8.5 |
| Methylene Chloride | 8.2–9.0 |
| Ethyl Acetate | 9.3–9.9 |
| 1,2-Dichloroethane | >14.0 |
| 1,1,2,2-Tetrachloroethane | >16.0 |

It is to be understood that the above-described examples are merely illustrative of the principles of the present invention, and that the solvents identified therein are intended only to be demonstrative of the usefulness of such materials generally. In this connection, since a solvent's suitability as the initial extracting agent is related to the solvent's bulk properties; i.e., immiscibility with water, ability to selective dissolve certain materials, etc., rather than to the solvent's molecular properties, any liquid hydrocarbon should be suitable for the initial extraction so long as it is immiscible with water and miscible with dichlorotoluene and aminochlorotoluene, and so long as diaminotoluene is essentially insoluble therein. Similarly, any organic solvent should be suitable for the second extraction so long as the solvent is immiscible with water and so long as the diaminotoluene is appreciably soluble therein. Furthermore, it should be understood that the successful application of the techniques described herein is essentially independent of the common variables; namely, time, temperature, and pressure. In this connection, the time required is that necessary for contacting the liquids plus that necessary for allowing the immiscible liquid phases to separate. Accordingly, it will be appreciated that variations and modifications of the above-described embodiments may be devised, and that such variations and modifications will fall within the spirit and scope of the present invention as defined in the following claims.

We claim:

1. In a process wherein a dichlorotoluene is reacted with aqueous ammonia in the presence of a soluble copper catalyst to obtain a mixture comprising unreacted dichlorotoluene, aminochlorotoluene, and diaminotoluene, the improvement which comprises extracting the mixture with a water-immiscible saturated hydrocarbon solvent having from five to 18 carbon atoms to remove dichlorotoluene and aminochlorotoluene therefrom, and subsequently extracting the remainder of said mixture with a water-immiscible organic solvent for diaminotoluene selected from the group consisting of ethyl acetate, chlorinated hydrocarbons having the formula $C_nCl_xH_{2n+2-x}$, wherein $n$ is an integer between 1 and 4, $x$ is an integer greater than 0 and less than $2n+2$ and mixtures thereof to remove diaminotoluene therefrom, leaving behind an aqueous ammonia-catalyst solution, wherein said extractions are carried out at a temperature in the range of about 0° to about 60°C.

2. The process of claim 1 wherein said extractions are carried out at a temperature in the range of about 20° to about 40°C.

3. The process of claim 1 wherein said saturated hydrocarbon solvent has from five to 12 carbon atoms.

4. The process of claim 3 wherein said hydrocarbon solvent is selected from the group consisting of pentane, heptane, dodecane and mixtures thereof.

5. The process of claim 1 wherein said organic solvent is selected from the group consisting of methylene chloride, 1,2-dichloroethane, 1,1,2,2-tetrachloroethane and mixtures thereof.

6. The process of claim 1 wherein at least one volume of said hydrocarbon solvent and at least one volume of said organic solvent are employed, respectively, per volume of material being extracted.

7. The process of claim 1 wherein from about two to about four volumes of said hydrocarbon solvent and from about two to about four volumes of said organic solvent are employed, respectively, per volume of material being extracted.

8. The process of claim 1 wherein at least one volume of said hydrocarbon solvent and at least one volume of said organic solvent are employed, respectively, per volume of material being extracted.

* * * * *

PO-1050
(5/69)

UNITED STATES PATENT OFFICE
CERTIFICATE OF CORRECTION

Patent No. 3,686,314  Dated  August 22, 1972

Inventor(s)  John D. Bacha and Charles M. Selwitz

It is certified that error appears in the above-identified patent and that said Letters Patent are hereby corrected as shown below:

Column 8, Table III, second line of Example 8, under "DCT", "$>1$" should read "$<1$".

Column 7, Footnote "a" of Table III, "2,4-s diaminotoluene" should read "2,4-diaminotoluene".

Signed and sealed this 20th day of March 1973.

(SEAL)
Attest:

EDWARD M. FLETCHER, JR.
Attesting Officer

ROBERT GOTTSCHALK
Commissioner of Patents